(12) United States Patent
Yoshizawa et al.

(10) Patent No.: US 12,604,089 B2
(45) Date of Patent: Apr. 14, 2026

(54) IMAGE CAPTURING APPARATUS HAVING AUDIO RECOGNITION, CONTROL METHOD THEREOF, AND STORAGE MEDIUM

(71) Applicant: CANON KABUSHIKI KAISHA, Tokyo (JP)

(72) Inventors: Akitaka Yoshizawa, Kanagawa (JP); Ayaka Kinoshita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 18/212,284

(22) Filed: Jun. 21, 2023

(65) Prior Publication Data

US 2024/0007742 A1 Jan. 4, 2024

(30) Foreign Application Priority Data

Jun. 30, 2022 (JP) ................................ 2022-106439

(51) Int. Cl.
*H04N 23/66* (2023.01)
*G10L 15/02* (2006.01)
(Continued)

(52) U.S. Cl.
CPC ............ *H04N 23/66* (2023.01); *G10L 15/02* (2013.01); *H04N 23/611* (2023.01); *H04N 23/80* (2023.01)

(58) Field of Classification Search
CPC ...... H04N 23/66; H04N 23/611; H04N 23/80; H04N 21/42203; H04N 5/144; H04N 23/633; H04N 23/60; H04N 5/9202; G10L 15/02; G10L 15/08; G10L 15/26; G10L 2015/088; G10L 17/26; G06F 3/167
(Continued)

(56) References Cited

U.S. PATENT DOCUMENTS

| | | | |
|---|---|---|---|
| 9,311,525 | B2 | 4/2016 | Kim et al. |
| 10,715,762 | B2 | 7/2020 | Lee et al. |

(Continued)

FOREIGN PATENT DOCUMENTS

| | | | |
|---|---|---|---|
| EP | 3402186 A1 | | 11/2018 |
| JP | 2006-003411 A | | 1/2006 |

(Continued)

OTHER PUBLICATIONS

European Search Report dated Nov. 10, 2023, in related European Patent Application No. 23178666.6.

(Continued)

*Primary Examiner* — Usman A Khan
(74) *Attorney, Agent, or Firm* — VENABLE LLP

(57) ABSTRACT

An image capturing apparatus obtains audio of an utterance that occurs in a vicinity of the image capturing apparatus, captures an image, and controls image transmission such that in response to a determination that an expression indicating a particular person is included in the audio of the utterance, transmits a first image related to the obtainment of the audio of the utterance among captured images to an external apparatus associated with the expression indicating the particular person. In addition, a second image captured in the external apparatus and related to playing of the first image is received from the external apparatus.

18 Claims, 7 Drawing Sheets

(51) Int. Cl.
*H04N 23/611* (2023.01)
*H04N 23/80* (2023.01)

(58) Field of Classification Search
USPC .......................................................... 348/207.1
See application file for complete search history.

(56) References Cited

U.S. PATENT DOCUMENTS

| | | | | |
|---|---|---|---|---|
| 11,032,514 | B2 | 6/2021 | Lee et al. | |
| 2006/0279629 | A1* | 12/2006 | Hocker | G08G 1/0175 348/143 |
| 2007/0081090 | A1* | 4/2007 | Singh | H04N 23/631 |
| 2008/0158334 | A1* | 7/2008 | Reponen | G10L 15/26 348/14.02 |
| 2012/0032806 | A1* | 2/2012 | Lee | G08B 23/00 340/573.1 |
| 2014/0229835 | A1* | 8/2014 | Ravine | H04L 65/61 709/206 |
| 2015/0269420 | A1* | 9/2015 | Kim | H04L 67/10 382/118 |
| 2016/0104122 | A1* | 4/2016 | Mande | H04W 4/02 705/7.19 |
| 2019/0037173 | A1* | 1/2019 | Lee | G06F 3/04842 |
| 2022/0150286 | A1* | 5/2022 | Bünger | G06V 40/172 |
| 2024/0172348 | A1* | 5/2024 | Bandeira | G06N 20/20 |

FOREIGN PATENT DOCUMENTS

| | | | |
|---|---|---|---|
| KR | 10-2016-0117634 | A | 10/2016 |
| KR | 10-2017-0091913 | A | 8/2017 |

OTHER PUBLICATIONS

Korean Office Action dated Jan. 13, 2026, in related Korean Patent Application No. 10-2023-0075898.

* cited by examiner

IMAGE CAPTURING APPARATUS HAVING AUDIO RECOGNITION, CONTROL METHOD THEREOF, AND STORAGE MEDIUM

BACKGROUND OF THE INVENTION

Field of the Invention

The present invention relates to an image capturing apparatus, a control method thereof, and a storage medium.

Description of the Related Art

In recent years, content, such as an image, is enjoyed by being viewed after being transmitted to a friend or a relative using a communication apparatus. In such a case, when an attempt is made to transmit an image to a friend or a relative, it is necessary that an image to be transmitted be attached to an e-mail or the like after a transmission destination and the image have been selected, and thus, it is cumbersome.

Japanese Patent Laid-Open No. 2006-003411 proposes a technique in which an abbreviation of a counterparty is recognized by speech recognition being applied to inputted speech, and a call is made to a destination corresponding to the recognized abbreviation. In such a technique, the burden of selecting a desired counterparty can be reduced.

Incidentally, cameras for periodically and continuously capturing images without a user giving an image capturing instruction have been developed. For example, lifelogging cameras capable of recording an everyday, ordinary scene as images by the camera being set in an arbitrary location in a room and automatically capturing images are known. When an image recorded by such a camera is shared with a friend or a relative, joy and pleasure of sharing may increase depending on the state of a recipient of the image.

SUMMARY OF THE INVENTION

The present invention has been made in view of the above-described problems, and an object thereof is to realize a technique for allowing facilitation of sharing of an image with a desired counterpart and sharing of a state of a recipient of the image.

In order to solve the aforementioned issues, one aspect of the present disclosure provides an image capturing apparatus comprising: one or more processors; and a memory storing instructions which, when the instructions are executed by the one or more processors, cause the image capturing apparatus to function as: an audio obtainment unit configured to obtain audio of an utterance that occurs in a vicinity of the image capturing apparatus; an image capturing unit configured to capture an image; a control unit configured to control image transmission such that in a case where an expression indicating a particular person is included in the audio of the utterance, the control unit transmits a first image related to the obtainment of the audio of the utterance among captured images to an external apparatus associated with the expression indicating the particular person; and a reception unit configured to receive from the external apparatus a second image captured in the external apparatus and related to playing of the first image.

Another aspect of the present disclosure provides an image capturing apparatus comprising: one or more processors; and a memory storing instructions which, when the instructions are executed by the one or more processors, cause the image capturing apparatus to function as: a reception unit configured to receive a first image transmitted from an external apparatus to the image capturing apparatus associated with an expression indicating a particular person, the first image being an image associated with obtainment of audio of an utterance including the expression indicating the particular person; an output unit configured to output the first image to a display unit such that the first image is played; and a control unit configured to capture a second image in response to playing of the first image, and control image transmission so as transmit the captured second image to the external apparatus.

Still another aspect of the present disclosure provides a method of controlling an image capturing apparatus, the method comprising: obtaining audio of an utterance that occurs in a vicinity of the image capturing apparatus; capturing an image; controlling image transmission such that in a case where an expression indicating a particular person is included in the audio of the utterance, a first image related to the obtainment of the audio of the utterance among captured images is transmitted to an external apparatus associated with the expression indicating the particular person; and receiving from the external apparatus a second image captured in the external apparatus and related to playing of the first image.

Yet still another aspect of the present disclosure provides a method of controlling an image capturing apparatus, the method comprising: receiving a first image transmitted from an external apparatus to the image capturing apparatus associated with an expression indicating a particular person, the first image being an image associated with obtainment of audio of an utterance including the expression indicating the particular person; outputting the first image to a display unit such that the first image is played; and capturing a second image in response to playing of the first image, and controlling image transmission so as transmit the captured second image to the external apparatus.

Still another aspect of the present disclosure provides a non-transitory computer-readable storage medium comprising instructions for performing the method of controlling an image capturing apparatus, the method comprising: obtaining audio of an utterance that occurs in a vicinity of the image capturing apparatus; capturing an image; controlling image transmission such that in a case where an expression indicating a particular person is included in the audio of the utterance, a first image related to the obtainment of the audio of the utterance among captured images is transmitted to an external apparatus associated with the expression indicating the particular person; and receiving from the external apparatus a second image captured in the external apparatus and related to playing of the first image.

According to the present invention, it is possible to facilitate sharing of an image with a desired counterpart and sharing of a state of a recipient of an image.

Further features of the present invention will become apparent from the following description of exemplary embodiments (with reference to the attached drawings).

DESCRIPTION OF THE EMBODIMENTS

First Embodiment

Figure 1A:
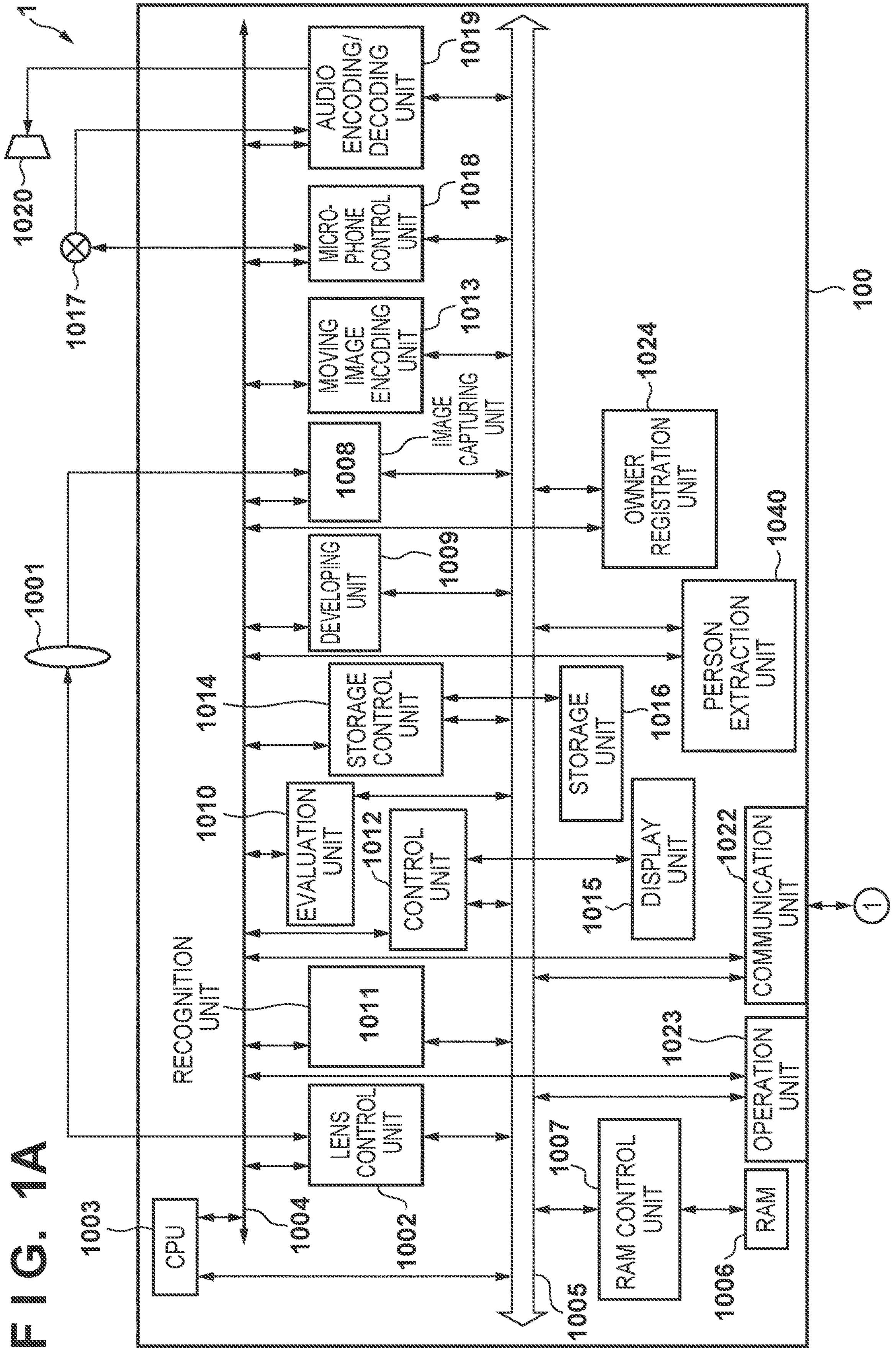
FIGS. 1A and 1B are block diagrams illustrating an example of a configuration of an image capturing system 1 according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Configuration Example of Image Capturing System)

Figure 1B:
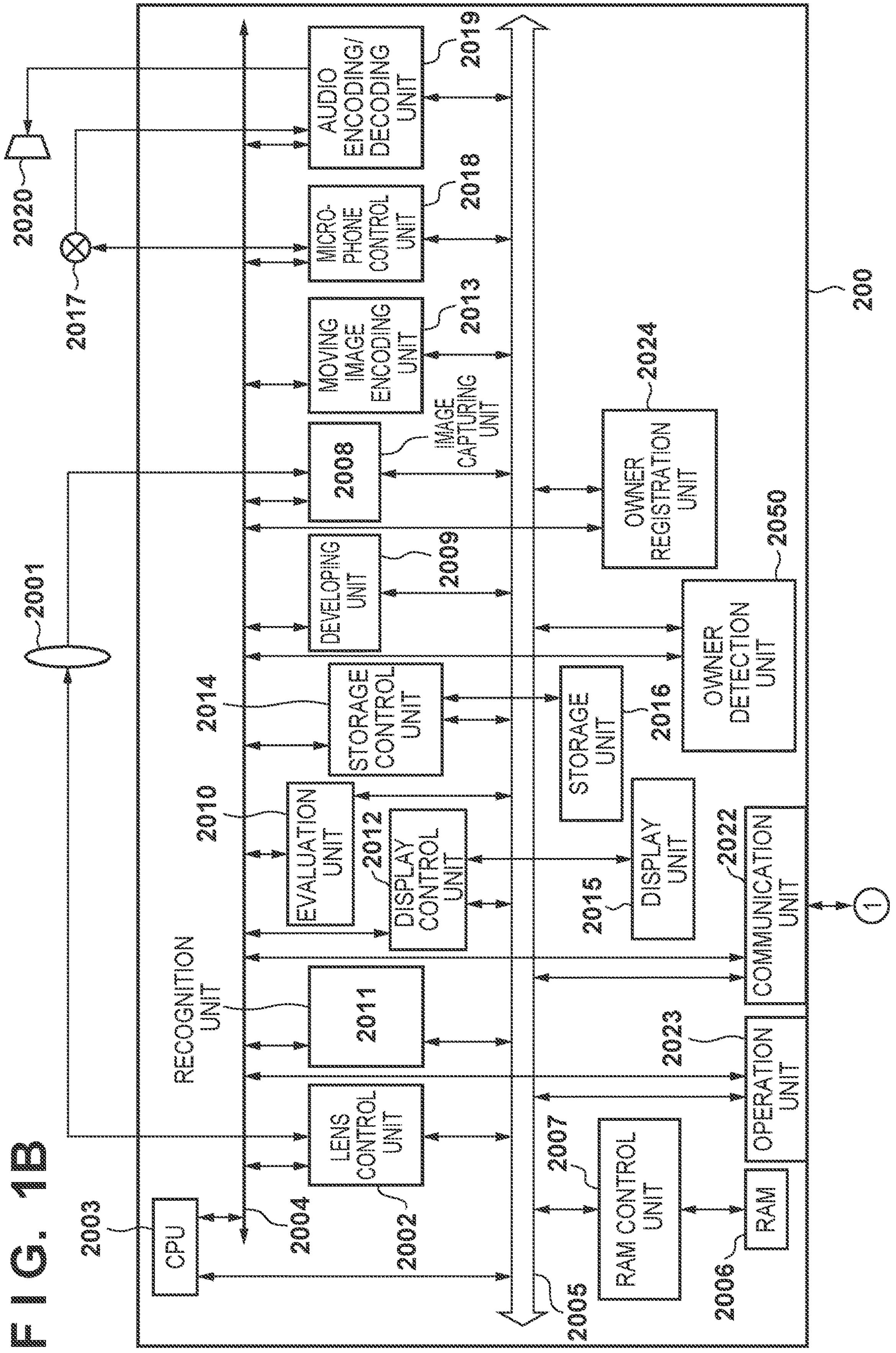

An image capturing system 1 according to a first embodiment will be described with reference to FIGS. 1A and 1B. The image capturing system 1 includes image capturing apparatuses 100 and 200. In the description of the present embodiment, a description will be given using a case where a moving image is transmitted between the image capturing apparatus 100 and the image capturing apparatus 200 as an example; however, the present embodiment is also applicable to a case where an image (i.e. still image or moving image) is transmitted between the image capturing apparatus 100 and the image capturing apparatus 200. A case where the image capturing apparatus 100 and the image capturing apparatus 200 are portable digital cameras will also be described as an example.

First, an example of a functional configuration of the image capturing apparatus 100 will be described. A lens 1001 is a group of lenses including a zoom lens and a focus lens. The lens 1001 may be included in an interchangeable lens. A lens control unit 1002 has a function of controlling a focal length and a state of a diaphragm of the lens 1001 based on subject information extracted by a recognition unit 1011.

A CPU 1003 includes, for example, one or more processors and is, for example, a central processing unit. The CPU 1003 controls operation of the entire image capturing apparatus 100, for example, by deploying a program stored in a storage unit 1016 or a non-volatile memory (not illustrated) in a random access memory (RAM) 1006, which will be described later, and executing the program. The CPU 1003 also executes an operation of the image capturing apparatus 100, which will be described later with reference to FIG. 2. A CPU bus 1004 controls communication between the CPU 1003 and each of the functional blocks. A configuration of each unit (e.g., the recognition unit 1011, a moving image encoding unit 1013, a person extraction unit 1040, and the like) of the image capturing apparatus 100, which will be described below, may be realized by the CPU 1003 executing a program.

A RAM control unit 1007 controls access to the RAM 1006 based on a RAM access request from each of the functional blocks. A RAM bus 1005 controls communication between the RAM control unit 1007 and each of the functional blocks. The RAM bus 1005 also has a function for arbitrating access to the RAM 1006 from each of the functional blocks.

An image capturing unit 1008 includes an image capturing element for converting light entering through the lens 1001 into electrical signals. Moving image data is formed by the image capturing element sequentially outputting image signals at predetermined intervals. The image capturing unit 1008 includes a function for correcting lens aberration for the obtained moving image data and a function for interpolating a defective pixel of an image sensor.

A developing unit 1009 converts the moving image data generated by the image capturing unit 1008 into signals constituted by luminance signals and color difference signals by performing DeBayer processing on the moving image data, and performs developing processing, such as removal of noise included in each of the signals, correction of optical distortion, and optimization of the image. An evaluation unit 1010 performs evaluation value calculation processing for calculating an evaluation value of a focus state, an exposure state, or the like based on the moving image data generated by the image capturing unit 1008.

The recognition unit 1011 performs recognition processing for detecting and recognizing subject information in the moving image data on which developing processing has been performed by the developing unit 1009 and generating the subject information. For example, the recognition unit 1011 executes processing for detecting a face in the moving image data and, when a face is detected, outputs information indicating a position of the face. The recognition unit 1011 further performs authentication of a particular person or the like based on feature information, such as a face.

A control unit 1012 outputs the moving image data on which developing processing has been performed by the developing unit 1009 to a display unit 1015 after performing predetermined display processing (e.g., conversion, graphics superimposition, and the like according to characteristics of a display panel of the display unit 1015). The display unit 1015 is configured by, for example, a liquid crystal panel, and displays reproduced moving image data. The display unit 1015, for example, is incorporated in the image capturing apparatus 100. However, the display unit 1015 may be configured so as to be arranged externally to the image capturing apparatus 100 and connected to the image capturing apparatus 100 via, for example, a wire.

The moving image encoding unit 1013 performs processing for converting the moving image data on which developing processing has been performed by the developing unit 1009 into a moving image file in which the amount of information has been compressed by compressing and encoding the moving image data using a predetermined moving image compression encoding method, such as MPEG4 Video. In addition to the processing for converting moving image data into a moving image file by compression, the moving image encoding unit 1013 may also have a function for decoding a moving image file when the moving image file is received externally via a communication unit 2022.

A storage control unit 1014 performs storage control processing for storing the moving image data on which developing processing has been performed by the developing unit 1009 in the storage unit 1016. The storage unit 1016 includes, for example, a non-volatile storage medium and may include, for example, a memory card or a hard disk. The storage unit 1016, for example, is incorporated in the image capturing apparatus 100. However, the storage unit 1016 may also be configured to be capable of being attached to and detached from the image capturing apparatus 100.

A microphone 1017 converts audio into an audio signal. The microphone 1017, for example, may be configured to be capable of being attached to and detached from the image capturing apparatus 100. However, the microphone 1017 may be incorporated in the image capturing apparatus 100. A microphone control unit 1018 is connected to the microphone 1017 and performs control of the microphone 1017, starting and stopping of audio collection, obtainment of collected audio data, and the like. The control of the microphone 1017 is, for example, gain adjustment, state obtainment, and the like.

An audio encoding/decoding unit 1019 obtains the audio signal inputted from the microphone 1017 and encodes or decodes the audio signal with a predetermined encoding method, such as MPEG4 Audio AAC. A speaker 1020 plays the audio signal decoded by the audio encoding/decoding unit 1019. The speaker 1020, for example, is configured to be capable of being attached to and detached from the image capturing apparatus 100 but may be incorporated in the image capturing apparatus 100.

The person extraction unit 1040 extracts a person's name from the audio data collected by the microphone 1017. For example, when audio of a user's utterance occurring in a vicinity of the image capturing apparatus 100 is obtained as the audio data, the person extraction unit 1040 extracts an expression indicating a person from the audio of the user's utterance, for example, with a known speech recognition technology in which a machine learning model is used. The expression indicating a person extracted here may include a name of a person, such as "Person A"; a title or a nickname, such as "Grandma"; and the like.

A communication unit 1022 is a communication interface for connecting the image capturing apparatus 100 to another apparatus wirelessly or by wire and transmitting and receiving a moving image file and the like, and can be connected to a network, such as a wireless local area network (LAN) or the Internet. The communication unit 1022 can transmit a moving image file obtained by the image capturing apparatus 100 and a moving image file stored in the storage unit 1016 to an external apparatus and can receive a moving image file and various types of information from an external apparatus.

An operation unit 1023 receives various operations from the user (e.g., owner of the image capturing apparatus 100) for performing various settings of the image capturing apparatus 100.

An owner registration unit 1024 registers a transmission destination (e.g., an owner of an external apparatus, such as the image capturing apparatus 200) of a moving image file in the RAM 1006. The owner registration unit 1024 may register an expression indicating a particular person, such as "Grandma", for example, as information of an owner of an external apparatus. The owner registration unit 1024 registers information of a transmission destination for transmitting a moving image to an external apparatus in association with an expression indicating a particular person. Information of a transmission destination for transmitting a moving image to an external apparatus may be various kinds of information, such as an e-mail address corresponding to a particular person, an account for a predetermined service, and an IP address of an external apparatus. According to such information, when an expression indicating a particular person is extracted from audio of an utterance by the person extraction unit 1040, the image capturing apparatus 100 can transmit a moving image to a transmission destination associated with the extracted expression indicating a particular person (e.g., "Grandma").

Next, the image capturing apparatus 200 will be described. The image capturing apparatus 200 includes units from a lens 2001 to an owner registration unit 2024. The lens 2001 to the owner registration unit 2024 are similar to the lens 1001 to the owner registration unit 1024, respectively, of the image capturing apparatus 100.

An owner detection unit 2050 detects a particular person (e.g., an owner of the image capturing apparatus 200) within a predetermined range from the image capturing apparatus 200. The owner detection unit 2050, for example, captures an image using the image capturing unit 2008 and detects a particular person from the captured image.

(Series of Operations for Capturing and Transmission of Moving Image in Image Capturing Apparatus 100)

Figure 2:
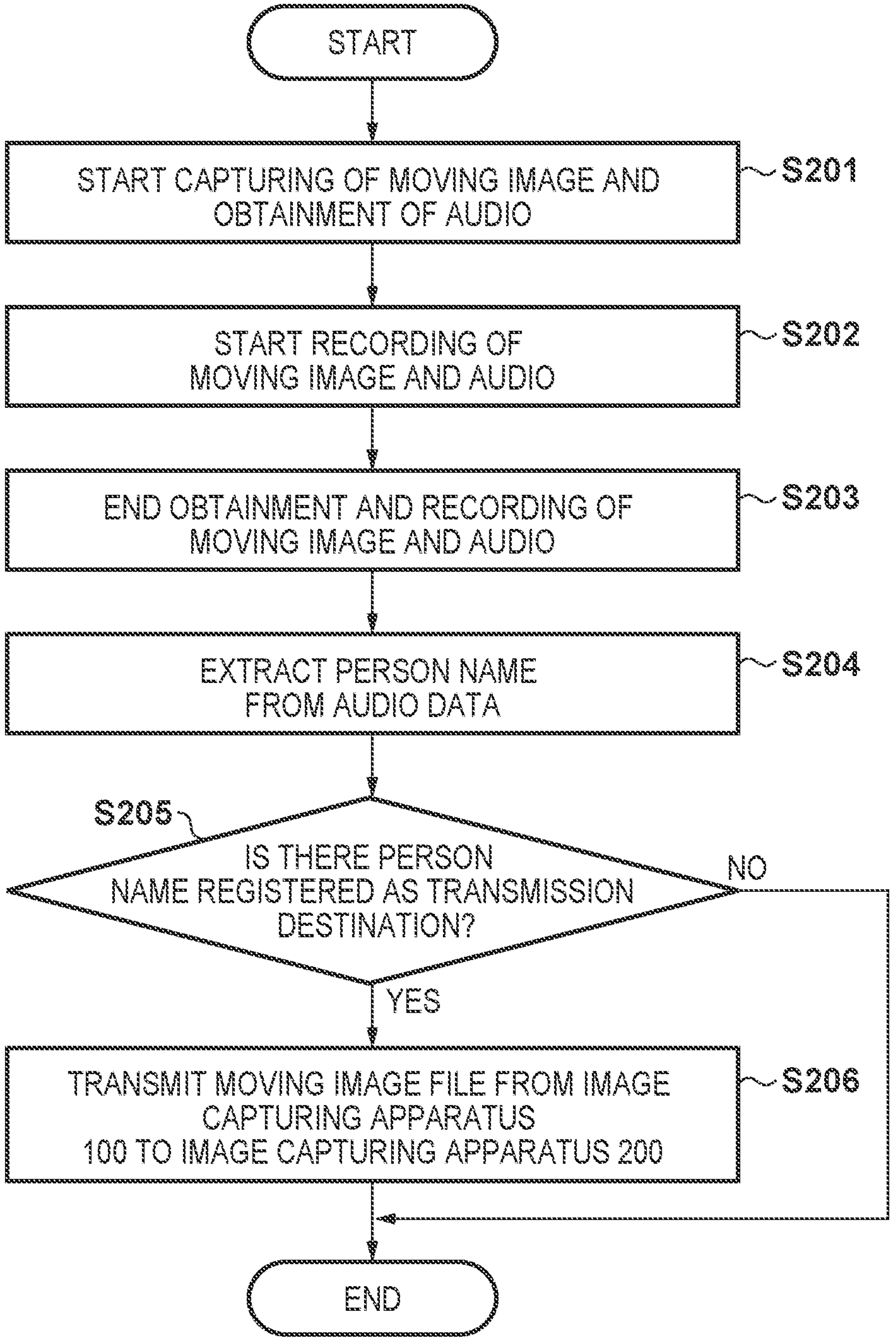
FIG. 2 is a flowchart for explaining a series of operations related to capturing and transmission of a moving image in an image capturing apparatus 100 according to the first embodiment.

Next, a series of operations related to capturing and transmission of a moving image in the image capturing apparatus 100 of the image capturing system 1 (operation in which the image capturing apparatus 100 captures a moving image and then transmits the captured moving image to the image capturing apparatus 200) will be described with reference to FIG. 2. The series of operations illustrated in FIG. 2 is realized, for example, by the CPU 1003 deploying a program stored in the storage unit 1016 or a non-volatile memory (not illustrated) in the RAM 1006 and executing the program. Further, the series of operations is performed when a power switch (not illustrated) of the image capturing apparatus 100 is in an on state.

The series of operations is applied, for example, when "Person A", who is the user or the owner of the image capturing apparatus 100, utters "I want to show this to Grandma, too" or the like at the time of capturing of a moving image in the image capturing apparatus 100. In such a case, the image capturing apparatus 100, for example, can transmit a moving image that has been captured within a predetermined period of time including the point in time at which Person A made the utterance to the image capturing apparatus 200 whose user or owner is "Person B" (who is a grandmother of Person A and is referred to as "Grandma").

In step S201, the CPU 1003 starts capturing of a moving image and obtainment of audio according to an image capturing start instruction operation of the user (e.g., owner) on the operation unit 1023.

In step S202, the CPU 1003 starts moving image recording processing and audio obtainment processing. In the moving image recording processing, images are continuously captured by the image capturing unit 1008 at a set frame rate, and the obtained image signals are encoded by the moving image encoding unit 1013 and are stored in the RAM 1006 as moving image data via the RAM bus 1005 and the RAM control unit 1007. In parallel, the CPU 1003 obtains audio data from the microphone 1017 by the microphone control unit 1018, encodes the obtained audio data by the audio encoding/decoding unit 1019, and stores the audio data in the RAM 1006 as audio data associated with the moving image data.

The CPU 1003 stores the moving image data and the audio data stored in the RAM 1006 in the storage unit 1016 via the storage control unit 1014 as a single moving image file, such as MPEG4. The series of moving image recording processing and audio obtainment processing is continuously executed until there is an image capturing end instruction operation by the user (e.g., owner) of the image capturing apparatus 100. When the CPU 1003 receives a moving image capturing end instruction operation of the user (e.g., owner) on the operation unit 1023, the processing proceeds from step S202 to step S203.

In step S203, the CPU 1003 ends the moving image recording processing and the audio obtainment processing. The CPU 1003 also ends obtainment of the moving image and the audio. In step S204, the person extraction unit 1040 extracts an expression (e.g., a person name) indicating a person included in the audio by executing speech recognition processing on the audio. In step S205, the CPU 1003 determines whether the expression (e.g., a person name) indicating a person extracted in step S204 matches a preregistered expression (e.g., a person name such as "Grandma") indicating a particular person. For example, the CPU 1003 determines whether an expression indicating a particular person registered in advance in the RAM 1006 as a transmission destination of a moving image file by the owner registration unit 1024 matches the extracted expression indicating a person. When the CPU 1003 determines that the extracted information matches the registered information, the processing proceeds to step S206; otherwise, the series of operations is ended.

In step S206, the moving image file is transmitted to the image capturing apparatus 200 via the communication unit 1022. More specifically, the CPU 1003 transmits a moving image file to a transmission destination associated with the expression indicating a particular person by referencing information registered in the owner registration unit 1024. At this time, the CPU 1003 transmits a moving image captured within a predetermined period of time including a point in time at which the expression indicating a particular person has been extracted to the image capturing apparatus 200 as a moving image related to the audio of the utterance. The CPU 1003 may transmit a plurality of moving images to the image capturing apparatus 200 as moving images captured within the predetermined period of time.

Thus, in the above-described series of operations, at the time of moving image capturing processing of the image capturing apparatus 100, the moving image file can be transmitted to the image capturing apparatus 200 when the expression indicating a particular person is extracted from the audio of the utterance.

In the above-described series of operations, the CPU 1003 may inquire to the user of the image capturing apparatus 100, for example, by display or audio, as to whether to transmit the captured moving image to the image capturing apparatus 200 prior to transmission of the moving image to the image capturing apparatus 200. In this case, the CPU 1003 transmits the captured moving image to the image capturing apparatus 200 in response to a response from the user indicating to transmit the captured moving image to the image capturing apparatus 200 being received. The CPU 1003 may receive a response from the user via the operation unit 1023 or with audio via the microphone 1017. When the CPU 1003 receives a response from the user indicating not to perform the transmission, the processing may be terminated without the moving image file being transmitted.

(Series of Operations from Playing of Moving Image to Transmission of Captured Moving Image in Image Capturing Apparatus 200)

Figure 3:
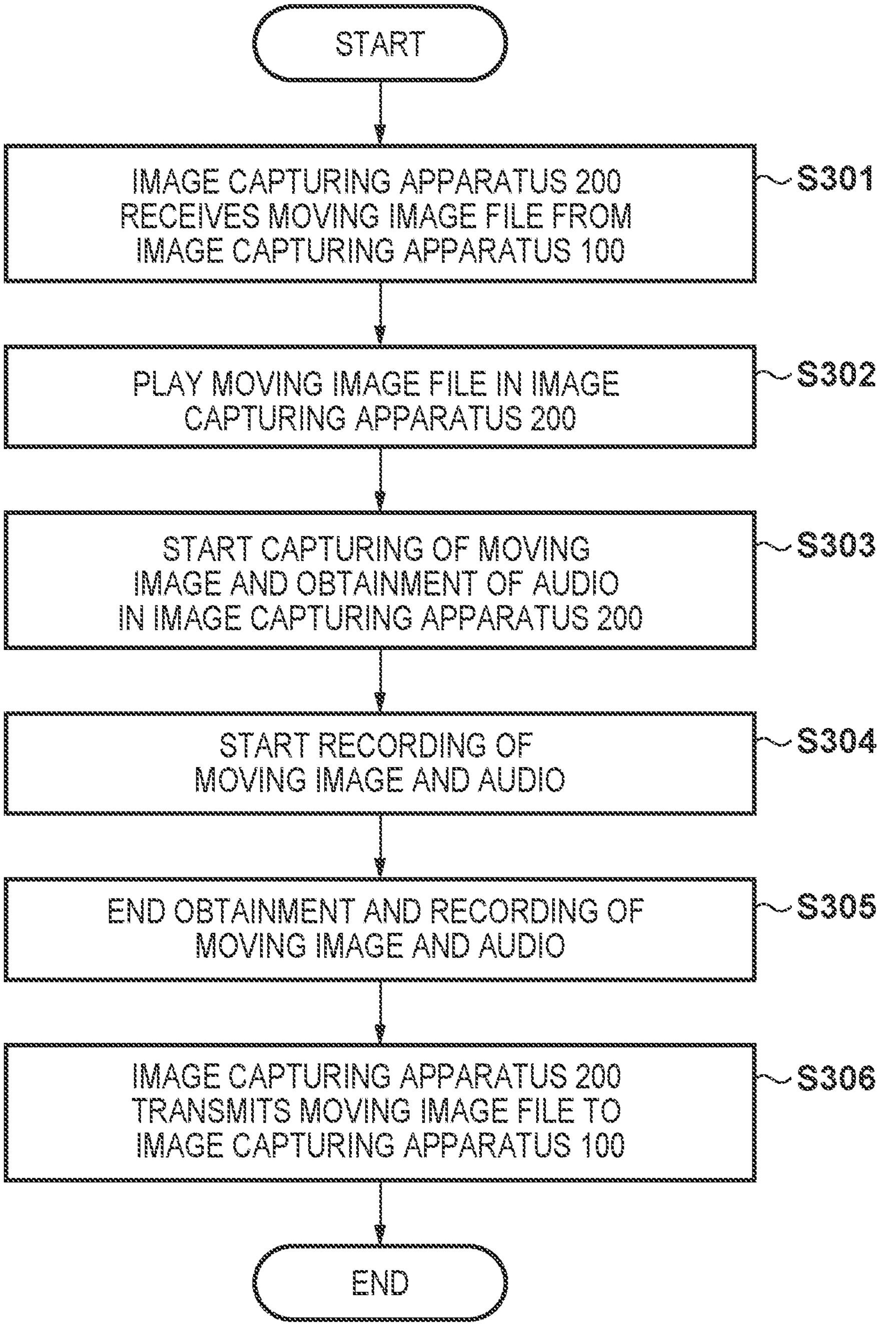
FIG. 3 is a flowchart for explaining a series of operations from playing of a moving image to transmission of a captured moving image in an image capturing apparatus 200 according to the first embodiment.

Next, a series of operations from playing of a moving image to transmission of a captured moving image (an operation for receiving a moving image file from the image capturing apparatus 100 and playing the moving image file and further transmitting a moving image to the image capturing apparatus 100) in the image capturing apparatus 200 of the image capturing system 1 will be described with reference to FIG. 3. The series of operations illustrated in FIG. 3 is realized, for example, by the CPU 2003 deploying a program stored in the storage unit 2016 or a non-volatile memory (not illustrated) in the RAM 2006 and executing the program. Further, the series of operations is performed when a power switch (not illustrated) of the image capturing apparatus 200 is in an on state. Further, the series of operations is applied, for example, when the image capturing apparatus 200 plays a moving image received from the image capturing apparatus 100 and then captures a state of "Person B" ("Grandma"), who is the user or the owner of the image capturing apparatus 200, and transmits the captured moving image to the image capturing apparatus 100.

In step S301, the CPU 2003 receives a moving image file transmitted from the image capturing apparatus 100 via the communication unit 2022. In step S302, the CPU 2003 reproduces the moving image file received in step S301 and outputs the moving image file to the display unit 2015 and the speaker 2020. At this time, for example, moving image data and audio data of the moving image file is decoded by the moving image encoding unit 2013 and the audio encoding/decoding unit 2019 of the image capturing apparatus 200 according to an instruction of the CPU 2003.

When the CPU 2003 outputs the moving image file so that the moving image file is played, the CPU 2003 may transmit information indicating that the moving image file has been played to the image capturing apparatus 100, which is the transmission source of the moving image file. The user of the image capturing apparatus 100 can recognize that the transmitted moving image file has been played in the image capturing apparatus 200.

In step S303, the CPU 2003 starts capturing of a moving image and obtainment of audio in the image capturing apparatus 200 after a predetermined period of time has elapsed from the start of playback in step S302. By thus performing capturing of a moving image and obtainment of audio in the image capturing apparatus 200, it is possible to capture a moving image in which the user (e.g., owner) of the image capturing apparatus 200 is included, and thereby, it is possible to capture an image of a state of the user when they watch the moving image being played.

The capturing of a moving image and the obtainment of audio may be started at another timing. For example, the CPU 2003 may start capturing of a moving image after a predetermined period of time from an end of playing of a moving image file. Alternatively, the CPU 2003 may cause the owner detection unit 2050 to detect a particular person (the user related to a transmission destination of the moving image) that is within a predetermined range of the image capturing apparatus 200 and capture a moving image when the user is detected. This makes it possible to more reliably capture an image of a state of a person viewing the moving image.

In addition, the CPU 2003 may inquire as to whether to capture a moving image, for example, by display or audio, and capture a moving image in response to a response from the user indicating to capture a moving image being received. The response from the user may be an input via the operation unit 2023 or may be an input by audio. It is possible to prevent a state of the user from being shared when the user does not wish to be captured in an image. When the CPU 2003 receives a response from the user indicating not to capture a moving image or does not receive a response from the user indicating to capture a moving image within a predetermined period of time, the processing may be terminated without the capturing of a moving image being started.

In step S304, the CPU 2003 starts moving image recording processing and audio obtainment processing. The moving image recording processing and the audio obtainment processing may be performed similarly to the operation in step S202 described above as an operation of the image capturing apparatus 100. By this, the CPU 2003 stores the obtained moving image and audio in the storage unit 2016 via the storage control unit 2014 as a single moving image file, such as MPEG4. The series of moving image recording processing and audio obtainment processing is continuously executed until there is an image capturing end instruction operation by the user (e.g., owner) of the image capturing apparatus 200. When the CPU 2003 receives a moving image capturing end instruction operation of the user (e.g., owner) on the operation unit 2023, the processing proceeds from step S304 to step S305. In step S305, the CPU 2003 ends the capturing of the moving image and the obtainment of the audio. In addition, the CPU 2003 ends the moving image recording processing and the audio obtainment processing.

In step S306, the CPU 2003 transmits the moving image file to the image capturing apparatus 100 via the communication unit 2022. In an example indicated here, when the CPU 2003 transmits the moving image file to the image capturing apparatus 100, the moving image file is transmitted unconditionally; however the present invention is not limited to this. For example, the CPU 2003 inquires as to whether to transmit the captured moving image to the image capturing apparatus 100 (an apparatus that is a transmission source of the played moving image). The CPU 2003 may transmit the moving image file to the image capturing apparatus 100 in response to a response from the user indicating to transmit the captured moving image being received. The response from the user may be an input via the operation unit 2023 or may be an input by audio. When the CPU 2003 receives a response from the user indicating not to perform the transmission, the processing is terminated without the moving image file being transmitted.

As described above, the image capturing apparatus 200 starts capturing of a moving image in response to playing of a moving image file transmitted from the image capturing apparatus 100 and transmits a file of the captured moving image to the image capturing apparatus 100. In this way, the user of the image capturing apparatus 200 can transmit their state when they watch the moving image captured by the image capturing apparatus 100 to the user of the image capturing apparatus 100 by an easy operation. In other words, the image capturing apparatus 200 can transmit a moving image of a reaction to the received moving image without effort.

When the moving image file is transmitted from the image capturing apparatus 200, the image capturing apparatus 100 receives the moving image file transmitted from the image capturing apparatus 200 and plays the moving image file.

Figure 4:
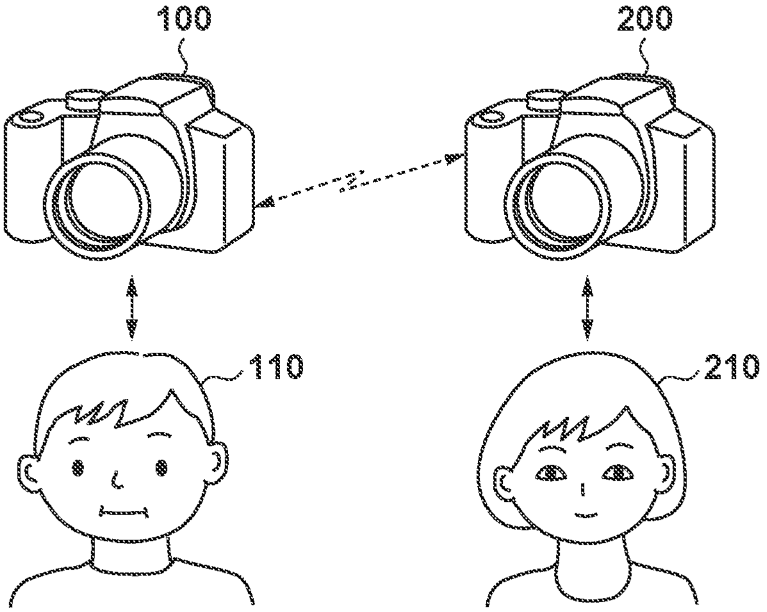
FIG. 4 is a diagram illustrating an example of the use of the image capturing system 1 according to the first embodiment.

FIG. 4 illustrates an example of the use of the image capturing system 1 of the present embodiment. In the image capturing system 1 illustrated in FIG. 4, a person 110 is registered as a user (e.g., owner) in the image capturing apparatus 100, and a person 210 is registered as a user (e.g., owner) in the image capturing apparatus 200. For example, in the above-described example of “Person A” and “Grandma”, the person 110 may correspond to “Person A” and the person 210 may correspond to “Grandma”, for example. First, a moving image file captured by the image capturing apparatus 100 is transmitted from the image capturing apparatus 100 to the image capturing apparatus 200 and is played in the image capturing apparatus 200. At this time, in the image capturing apparatus 200, capturing of a moving image is started by the moving image being played, and so, it is possible to capture a moving image in which a state of “Grandma” watching the moving image is captured. The captured moving image is then transmitted to the image capturing apparatus 100 of “Person A”. Therefore, “Person A” can watch the state of “Grandma” watching the moving image that “Person A” transmitted. In this way, the person 110 and the person 210 can realize communication in which moving images are transmitted to each other via the image capturing apparatuses 100 and 200. That is, it is possible to facilitate sharing of a moving image from the image capturing apparatus 100 and sharing of a state of a recipient of the moving image (sharing of a moving image captured by the image capturing apparatus 200).

Second Embodiment

In the first embodiment, a case where the display unit 2015 is part of the image capturing apparatus 200 has been described. In the present embodiment, a case where a display unit 500 is present externally to the image capturing apparatus 200 will be described. The display unit 500 that is external to the image capturing apparatus 200 may be an independent display apparatus, such as a television or a monitor, for example. In the following description, a description will be given using a case where the display unit 500 is an apparatus capable of wired or wireless communication as an example. The configurations of the image capturing apparatus 100 and the image capturing apparatus 200 according to the present embodiment can be similar to the configurations in the first embodiment. Therefore, the same reference numerals will be assigned and descriptions will be omitted for configurations that are the same or substantially the same as the configurations described above in the first embodiment, and a description will be given mainly on points of difference.

Figure 5:
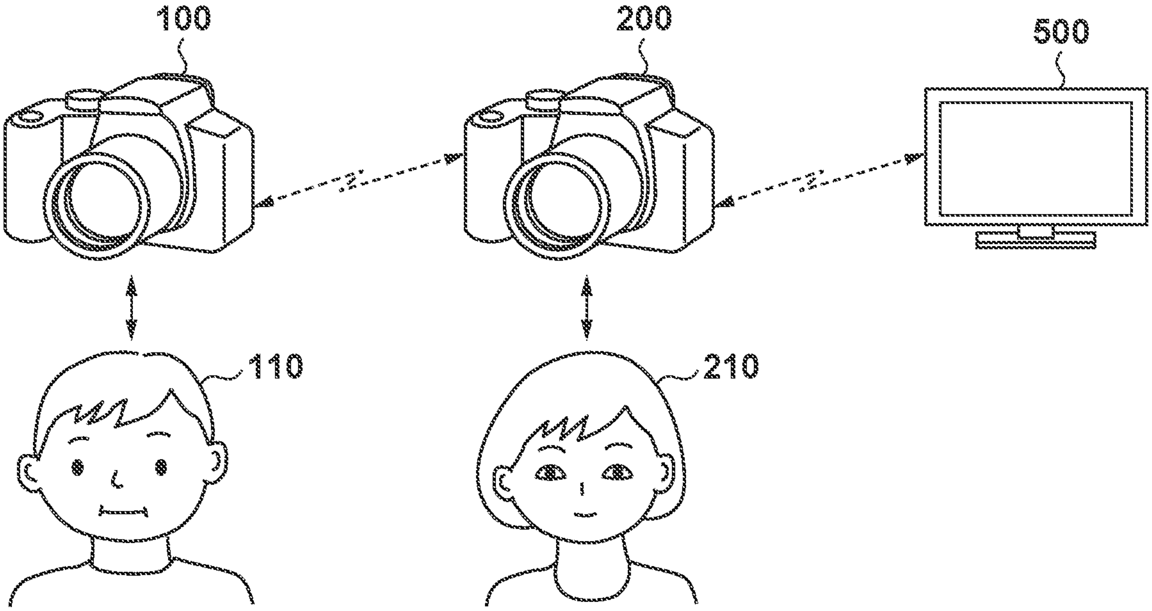
FIG. 5 is a diagram illustrating an example of the use of the image capturing system 1 according to a second embodiment.

An image capturing system according to a second embodiment will be described with reference to FIG. 5. As illustrated in FIG. 5, in an example of the present embodiment, the display unit 500 is installed externally to the image capturing apparatus 200, and a moving image is displayed on a display panel after being received from the image capturing apparatus 200 by wired or wireless communication.

(Series of Operations from Playing of Moving Image to Transmission of Captured Moving Image in Image Capturing Apparatus 200)

Figure 6:
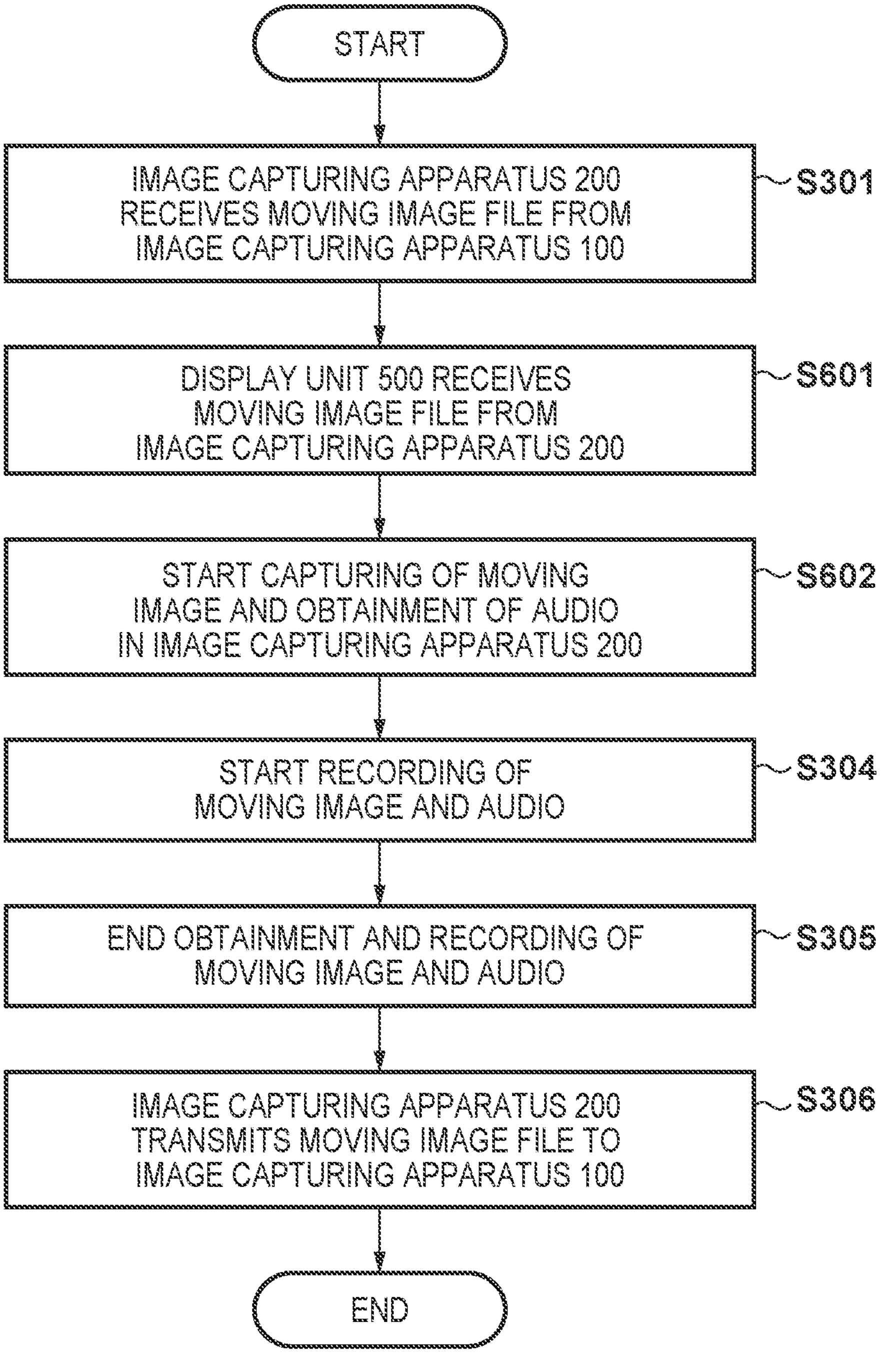
FIG. 6 is a flowchart for explaining a series of operations from playing of a moving image to transmission of a captured moving image in the image capturing apparatus 200 according to the second embodiment.

Next, a series of operations from playing of a moving image to transmission of a captured moving image (an operation for receiving a moving image file from the image capturing apparatus 100 and playing the moving image file and further transmitting a moving image to the image capturing apparatus 100) in the image capturing apparatus 200 of the image capturing system 1 will be described with reference to FIG. 6. The series of operations illustrated in FIG. 6 is realized, for example, by the CPU 2003 deploying a program stored in the storage unit 2016 or a non-volatile memory (not illustrated) in the RAM 2006 and executing the program.

Similarly to the first embodiment, the CPU 2003 of the image capturing apparatus 200 receives a moving image file transmitted from the image capturing apparatus 100 by executing step S301.

In step S601, the CPU 2003 transmits (outputs) the moving image file to the display unit 500. In the present embodiment, the moving image file, for example, may be displayed by being decoded on the display unit 500 side. Although a description is given using a case where the CPU 2003 transmits the moving image file received in step S301 to the display unit 500 as an example, a configuration may be taken such that the moving image file is decoded on the image capturing apparatus 200 side and the decoded moving image data is transmitted (outputted) to the display unit 500.

In step S602, the CPU 2003 starts capturing of a moving image and obtainment of audio in the image capturing apparatus 200 after a predetermined period of time has elapsed from the transmission of the moving image file in step S601.

Furthermore, the CPU 2003 transmits a file of the captured moving image to the image capturing apparatus 100 by executing processing from step S304 to step S306 similarly to the first embodiment. The CPU 2003 then terminates the sequence of operations.

Even in this way, the user of the image capturing apparatus 200 can transmit their state when they watch the moving image captured by the image capturing apparatus 100 to the user of the image capturing apparatus 100 by an easy operation. In other words, the image capturing apparatus 200 can transmit a moving image of a reaction to the received moving image without effort. In the present embodiment, the user of the image capturing apparatus 200 can play a moving image in a display apparatus that is more suitable for viewing.

Figure 7:
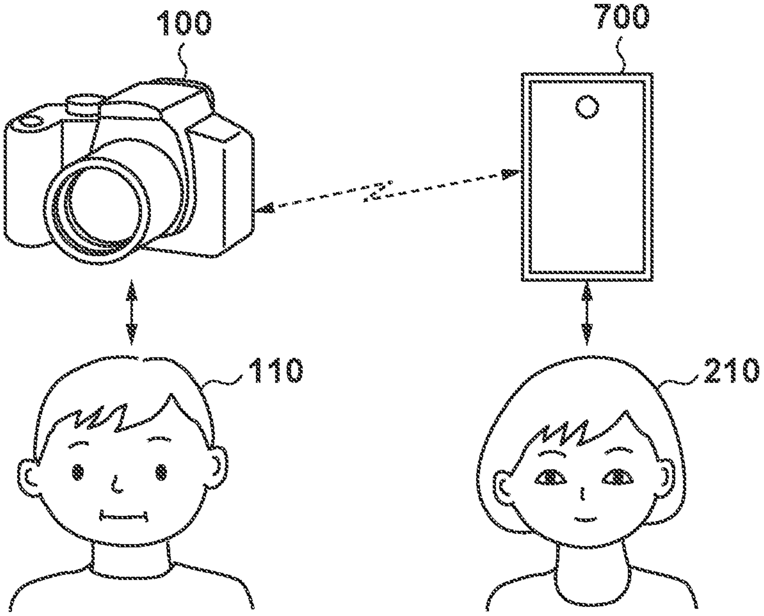
FIG. 7 is a diagram for explaining another example of the image capturing system 1.

In the above-described embodiments, a description has been given using as an example a case where a digital camera is used as an example of the image capturing apparatus. However, for example, a form may be such that at least one is a smartphone 700 as illustrated in FIG. 7. Further, at least one of these apparatuses may be a stationary camera or may be a smartphone, a game console, a personal computer, a tablet terminal, a display apparatus, or the like.

Further, in the above-described embodiments, a description has been given using a case where a moving image is recorded as an example; however, similar processing can be performed also for a case where a still image is recorded. When a still image is to be processed, audio data to be obtained in step S202 of FIG. 2 may be, for example, audio data from a predetermined period of time before and after the capturing of the still image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-106439, filed Jun. 30, 2022, which is hereby incorporated by reference herein in its entirety.

What is claimed is:

1. An image capturing apparatus comprising:

one or more processors; and a memory storing instructions which, when the instructions are executed by the one or more processors, cause the image capturing apparatus to function as:

an audio obtainment unit configured to obtain audio of an utterance that occurs in a vicinity of the image capturing apparatus;

an image capturing unit configured to capture an image;

a control unit configured to control image transmission so as to transmit, in response to a determination, after the capturing by the image capturing unit and the obtainment of the audio by the audio obtainment unit have been ended by a user operation, that an expression indicating a particular person is included in the audio of the utterance, a first image related to the obtainment of the audio of the utterance among captured images to an external apparatus associated with the expression indicating the particular person; and a reception unit configured to receive from the external apparatus a second image captured in the external apparatus and related to playing of the first image, wherein the second image is an image captured in the external apparatus after the first image has been played and the second image is transmitted to the image capturing apparatus after the capturing by the external apparatus has been ended by a user operation.

2. The image capturing apparatus of claim 1, further comprising:

a registration unit configured to register the expression indicating the particular person and information of a transmission destination for transmitting an image to the external apparatus in association; and an extraction unit configured to extract an expression indicating a person from the obtained audio of the utterance, wherein in a case where the expression indicating the particular person is extracted from the audio of the utterance by the extraction unit, the control unit controls image transmission so as to transmit the first image to the transmission destination associated with the expression indicating the particular person.

3. The image capturing apparatus of claim 1, wherein the control unit inquires to a user of the image capturing apparatus as to whether to transmit the first image to the external apparatus, and in response to reception of a response from the user indicating to transmit the first image to the external apparatus, the control unit controls image transmission so as to transmit the first image to the external apparatus.

4. The image capturing apparatus of claim 1, wherein the control unit transmits at least one of one or more images captured within a predetermined period of time including a point in time at which it is determined that the expression indicating the particular person is included in the audio of the utterance to the external apparatus as the first image.

5. The image capturing apparatus of claim 1, wherein the second image includes a moving image in which the particular person is included in the image.

6. An image capturing apparatus comprising:
one or more processors; and
a memory storing instructions which, when the instructions are executed by the one or more processors, cause the image capturing apparatus to function as:
a reception unit configured to receive a first image transmitted, in response to a determination that, after capturing by an external apparatus and the obtainment of an audio by the external apparatus have been ended by a user operation, an expression indicating a particular person is included in the audio of an utterance, from an the external apparatus to the image capturing apparatus associated with the expression indicating the particular person, the first image being an image associated with obtainment of audio of the utterance including the expression indicating the particular person;
an output unit configured to output the first image to a display unit such that the first image is played; and
a control unit configured to capture a second image in response to playing of the first image, and control image transmission so as transmit the captured second image to the external apparatus,
wherein the captured second image is an image captured in the image capturing apparatus after the first image has been played and the captured second image is transmitted to the external apparatus after the capturing by the image capturing apparatus has been ended by a user operation.

7. The image capturing apparatus of claim 6, wherein the output unit transmits the first image to a display apparatus external to the image capturing apparatus such that the first image is displayed in the display apparatus.

8. The image capturing apparatus of claim 6, wherein in a case where the control unit outputs the first image such that the first image is played, the control unit transmits information indicating that the first image is played to the external apparatus that transmitted the first image.

9. The image capturing apparatus of claim 6, further comprising:
a detection unit configured to detect the particular person in a predetermined range from the image capturing apparatus,
wherein in a case where the particular person is detected, the control unit captures the second image.

10. The image capturing apparatus of claim 6, wherein the control unit inquires as to whether to capture the second image, and in response to reception of a response from the particular person indicating to capture the second image, the control unit captures the second image.

11. The image capturing apparatus of claim 6, wherein the control unit captures the second image after a predetermined period of time from a point in time at which output of the first image is started.

12. The image capturing apparatus of claim 6, wherein the control unit captures the second image after a predetermined period of time from a point in time at which output of the first image is ended.

13. The image capturing apparatus of claim 6, wherein the control unit inquires as to whether to transmit the captured second image to the external apparatus that transmitted the first image, and in response to reception of a response from the particular person indicating to transmit the second image, the control unit transmits the second image to the external apparatus.

14. The image capturing apparatus of claim 6, wherein the second image includes a moving image in which the particular person is included in the image.

15. The image capturing apparatus of claim 6, wherein the expression indicating the particular person is a person whose name is registered in advance in the external apparatus.

16. A method of controlling an image capturing apparatus, the method comprising:
obtaining audio of an utterance that occurs in a vicinity of the image capturing apparatus;
capturing an image;
controlling image transmission so as to transmit, in response to a determination, after the capturing by the image capturing apparatus and the obtainment of the audio by the image capturing apparatus have been ended by a user operation, that an expression indicating a particular person is included in the audio of the utterance, a first image related to the obtainment of the audio of the utterance among captured images is transmitted to an external apparatus associated with the expression indicating the particular person; and
receiving from the external apparatus a second image captured in the external apparatus and related to playing of the first image,
wherein the second image is an image captured in the external apparatus after the first image has been played and the second image is transmitted to the image capturing apparatus after the capturing by the external apparatus has been ended by a user operation.

17. A method of controlling an image capturing apparatus, the method comprising:
receiving a first image transmitted, in response to a determination, after capturing by an external apparatus and the obtainment of an audio by the external apparatus have been ended by a user operation, that an expression indicating a particular person is included in the audio of an utterance, from the external apparatus to the image capturing apparatus associated with the expression indicating the particular person, the first image being an image associated with obtainment of audio of the utterance including the expression indicating the particular person;
outputting the first image to a display unit such that the first image is played; and
capturing a second image in response to playing of the first image, and controlling image transmission so as transmit the captured second image to the external apparatus, wherein the captured second image is an image captured in the image capturing apparatus after the first image has been played and the captured second image is transmitted to the external apparatus after the capturing by the image capturing apparatus has been ended by a user operation.

18. A non-transitory computer-readable storage medium comprising instructions for performing the method of controlling an image capturing apparatus, the method comprising:

obtaining audio of an utterance that occurs in a vicinity of the image capturing apparatus;

capturing an image;

controlling image transmission so as to transmit, in response to a determination, after the capturing by the image capturing apparatus and the obtainment of the audio by the image capturing apparatus have been ended by a user operation, that an expression indicating a particular person is included in the audio of the utterance, a first image related to the obtainment of the audio of the utterance among captured images is transmitted to an external apparatus associated with the expression indicating the particular person; and receiving from the external apparatus a second image captured in the external apparatus and related to playing of the first image, wherein the second image is an image captured in the external apparatus after the first image has been played and the second image is transmitted to the image capturing apparatus after the capturing by the external apparatus has been ended by a user operation.

* * * * *